July 23, 1968     D. G. FAWKES     3,393,697

VALVE SEAT

Filed March 10, 1958     3 Sheets-Sheet 1

Inventor:
Donald G. Fawkes
By Schroeder, Hofgren,
Brady & Wegner
Attorneys

July 23, 1968   D. G. FAWKES   3,393,697
VALVE SEAT
Filed March 10, 1958   3 Sheets-Sheet 2
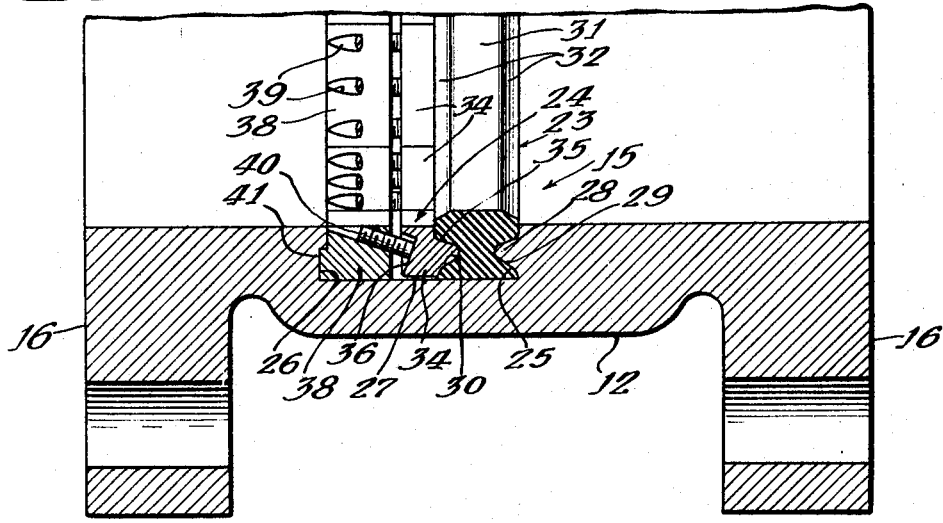
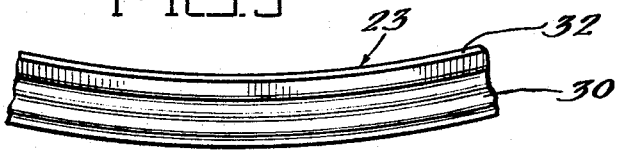
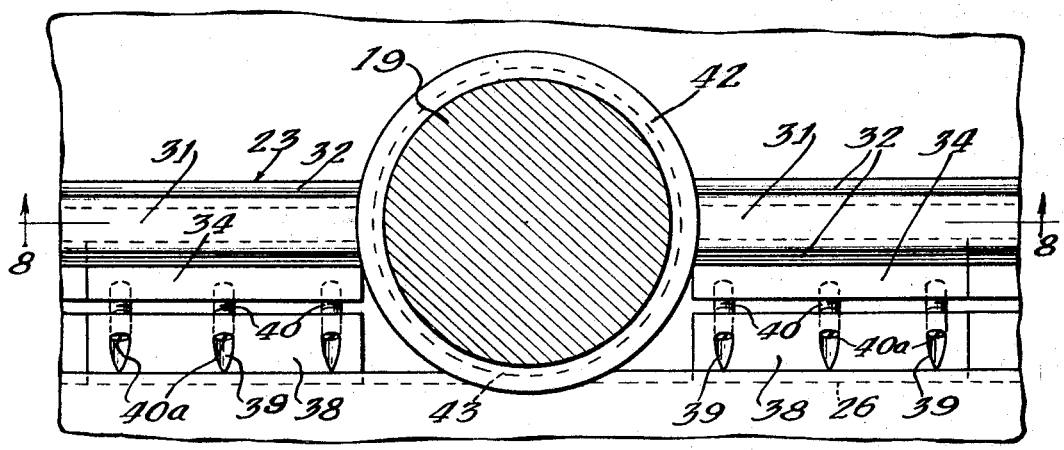
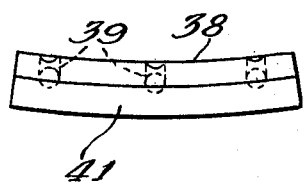
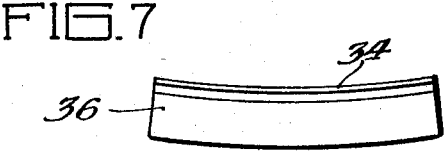
Inventor:
Donald G. Fawkes
By: Schroeder, Hofgren,
Brady & Wegner
Attorneys July 23, 1968

D. G. FAWKES 3,393,697

VALVE SEAT

Filed March 10, 1958

Inventor:
Donald G. Fawkes
By: Schroeder, Hofgren,
Brady & Wegner
Attorneys

United States Patent Office 3,393,697
Patented July 23, 1968

3,393,697
VALVE SEAT
Donald G. Fawkes, Chicago, Ill., assignor to Henry Pratt Company, a corporation of Illinois
Filed Mar. 10, 1958, Ser. No. 720,307
2 Claims. (Cl. 137—315)

This invention relates to butterfly valves and in particular to large diameter, high-pressure butterfly valves.

Butterfly valves, such as used in water mains, are relatively large, having diameters ranging from nominally eight inches to several feet. In these valves, particularly the larger size valves, it has heretofore been difficult to provide an accurate fit between the peripheral edge of valve gate and the inner surface of the annular valve seat. One of the principal causes for such inaccuracy in the fit is the variation in the thickness of the material of which the annular valve seat is formed. Such valve seats are preferably formed of rubber extrusions which, because of the manufacturing thickness tolerances, may produce a variation of $\frac{1}{16}''$ in the internal diameter of the valve seat. Another cause of variations in the internal diameter of the valve seat is the difficulties of manufacturing the annular valve body on which the valve seat is carried to very close tolerances, particularly in the larger sizes. To eliminate this undesirable variation in the internal diameter of the valve seat, relatively costly and time-consuming hand fitting has been necessitated. One of the procedures for fitting the valve elements has been to provide a valve disc having an original outer diameter slightly larger than the minimum diameter of the valve seat and to adjust the diameter of the valve disc such as by grinding the periphery thereof.

The principal object of this invention is to provide a new and improved valve seat structure for use in a butterfly valve.

Another object is to provide such a valve seat structure having new and improved means for adjusting the internal diameter of the valve seat to have an accurate fit with the valve disc periphery.

A further object is to provide such a valve seat structure wherein the internal diameter of the valve seat is adjusted by compressing adjustably the thickness thereof, subsequent to the installation of the valve seat in the valve.

Still another object is to provide such a valve seat structure having new and improved means for adjustably compressing the thickness of the valve seat.

A still further object is to provide such a valve seat structure wherein the means for effecting the adjustment of the seat thickness includes means defining a novel groove structure in the valve body and new and improved means within the groove for effecting an adjustable compression of the valve seat in the longitudinal direction thereby to effect the desired adjustment in the radially inward direction.

A still further object is to provide such a valve seat structure wherein the adjusting means further acts to seal the seat to the body member in a new and improved manner.

A yet further object is to provide such a valve wherein the valve seat is arranged so that, when the valve disc is in the closed position, the internal diameter of the portion of the valve seat downstream thereof can not be bulged inwardly about the disc by the pressure of the fluid which may enter behind the seat material.

Other objects, features and advantages of the present invention will be apparent from the following description of the preferred embodiment illustrated in the accompanying drawings, in which:

FIG. 3 is an enlarged section taken approximately along the line 3—3 of FIG. 1;

FIG. 4 is an enlarged section taken approximately along the line 4—4 of FIG. 1;

FIG. 5 is a fragmentary elevation of the valve seat;

FIG. 6 is an elevation of one segment of the clamping portion of the retaining means;

FIG. 7 is an elevation of one segment of the supporting portion of the retaining means;

Figure 1:
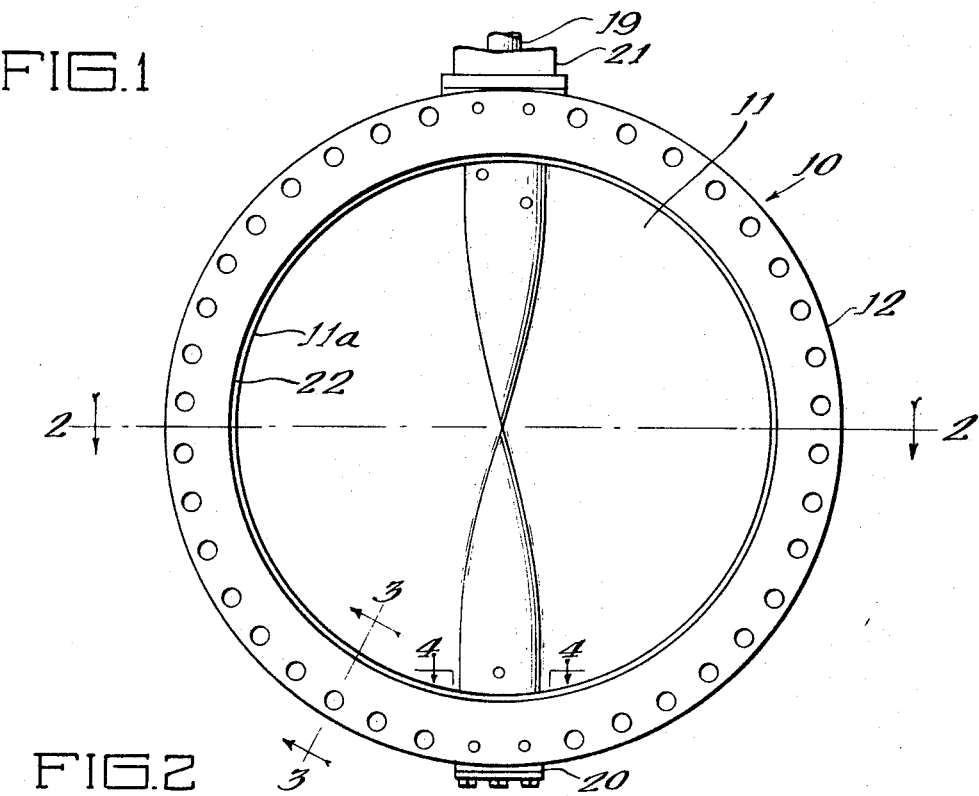
FIG. 1 is a front elevation of a valve embodying the invention, the upper portion of the shaft and journal means being shown fragmentarily.

In the exemplary embodiment of the invention, as disclosed in FIGS. 1 through 8 of the drawings, a butterfly valve generally designated 10 is shown to comprise a closure or disc 11 journalled in a cylindrical body 12 for rotation about a vertical diameter of the body between a closed position transversely across the body and an open position angularly thereto. Valve 10 is arranged to be installed directly in a duct, such as a water main M, between a portion 13 and a portion 14 thereof.

The instant invention comprehends a new and improved means 15 on body 12 for sealing the peripheral edge of disc 11 to the body in the closed position. More specifically, the instant invention comprehends new and improved means for adjusting the internal diameter of the rubber seat to obtain the desired accurate fit with the peripheral edge of disc 11.

Figure 2:
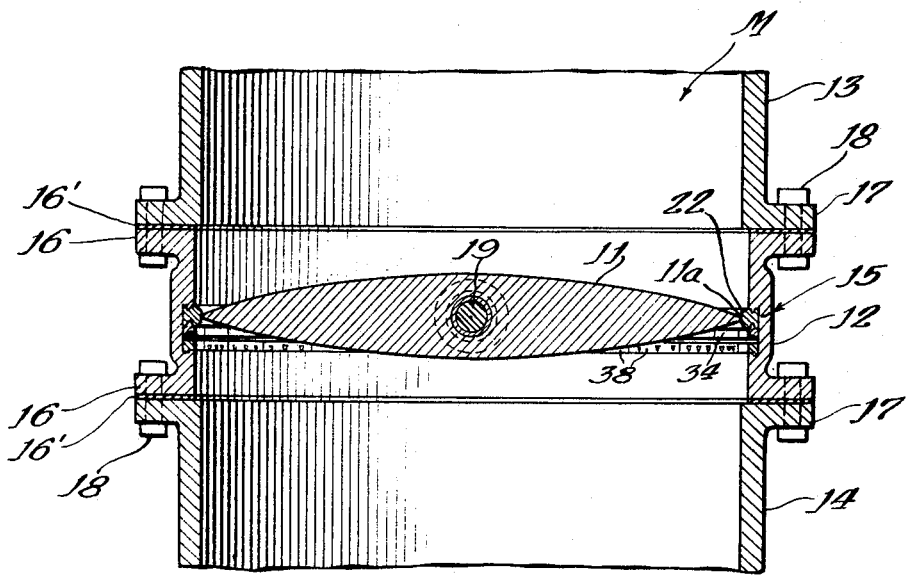
FIG. 2 is a horizontal section taken approximately along the line 2—2 of FIG. 1.

As best seen in FIGS. 1 and 2, body 12 comprises a cylindrical member having end flanges 16 secured to flanges 17 on portions 13 and 14 of main M by means of suitable bolts 18. Gaskets 16' are disposed between the flanges to assure a watertight seal.

Disc 11 comprises a fabricated or cast member having a circular periphery 11a slightly smaller in diameter than the internal diameter of body 12. The internal diameter of body 12 may be slightly larger than the internal diameter of water main portions 13 and 14; thus, sealing means 15, which projects somewhat inwardly from body 12, may have an internal diameter comparable to the internal diameter of portions 13 and 14.

Disc 11 is secured to a vertical shaft 19 which is journalled at its lower end in a lower bearing 20 and at its upper end in an upper bearing 21. Bearings 20 and 21 are carried on body 12 in vertical alignment so that shaft 19 may rotate about a vertical diameter of body 12. A suitable operator (not shown) may be provided for effecting the desired rotation of shaft 19 to move the disc 11 between a closed position wherein it extends transversely across body 12 (as shown in FIG. 2) and an open position 90° therefrom.

As best seen in FIGS. 3 through 7, the seat structure comprising the sealing means 15 includes a mid-portion of body 12 defining an annular or circumferential groove 22 in which is received an annular valve seat 23 and an annular retaining means 24. Groove 22 opens inwardly toward the axis of body 12 intermediate end flanges 16 thereof and is provided with a first side wall 25, a second side wall 26 and an outer bottom 27. Side walls 25 and 26 are undercut, the undercutting of side wall 25 being effectively defined by an annular protuberance 28 tapering toward side wall 26 and being spaced inwardly from bottom 27.

Valve seat 23 comprises an annular member formed of a resilient material, such as rubber, and having a generally dumbbell-shaped transverse cross section, as best seen in FIG. 3. One side 29 of the valve seat is complementary to and abuts side wall 25 of groove 22, and the opposite side 30 is reversibly similar to side 29. The radial thickness of seat 23 is slightly greater than the depth of groove 22 and, as discussed above, the internal diameter thereof, as defined by an inner surface 31, is comparable to the internal diameter of portions 13 and 14 of main M. Edge surfaces 32 of the projecting portion of seat 23 are preferably bevelled to guide the peripheral edge of gate 11 into sealing contact with surface 31 if necessary. As the seat projects substantially inwardly from body 12, any foreign material is prevented from being wedged between the disc periphery 11a and the metal body 12, but rather any such materials are caused to engage only the rubber seat wherein they are resiliently accommodated. Thus, damage of the valve due to such materials is substantially limited to the valve seat which is readily replaceable.

The rubber valve seat 23 is held in place by retaining means 24, comprising two portions. A first, clamping portion or pressure member is formed of a plurality of arcuate segments 34 extending and abutting end to end. One side 35 of segments 34 is complementary to and abuts side 30 of seat 23. The opposite side of segments 34 is recessed at the outer portion to define a segmentally frusto-conical surface 36 narrowing toward groove side wall 26.

The second portion of retaining means 24 comprises a plurality of arcuate segments 38 extending and abutting end to end. Segments 38 are provided with a plurality of threaded bores 39 extending perpendicular to frusto-conical surface 36 on the clamping segments 34 and, thus, outwardly toward the bottom 27 of the groove 22. A plurality of screws or threaded studs 40 are provided one each in each of bores 39 to extend therethrough into abutment with surface 36. At their outer ends, each of studs 40 may be provided with a suitable slot 40a for co-operation with a tool, such as a screwdriver, to effect desired threading of the studs in bores 39.

The side surfaces 41 of segments 38, which confront undercut groove side wall 26, are complementary thereto and, thus, when segments 38 are disposed with surfaces 41 in abutting relationship with side wall 26, the segments are properly retained in groove 22. As best seen in FIG. 3, the depth of undercutting of side wall 26 is made to be no greater than the spacing between segments 34 and segments 38 when retaining means 24 is properly installed in groove 22. Thus, by withdrawing studs 40 to permit abutment of segments 34 and 38, segments 38 may be readily installed or removed relative to the groove.

Figure 8:
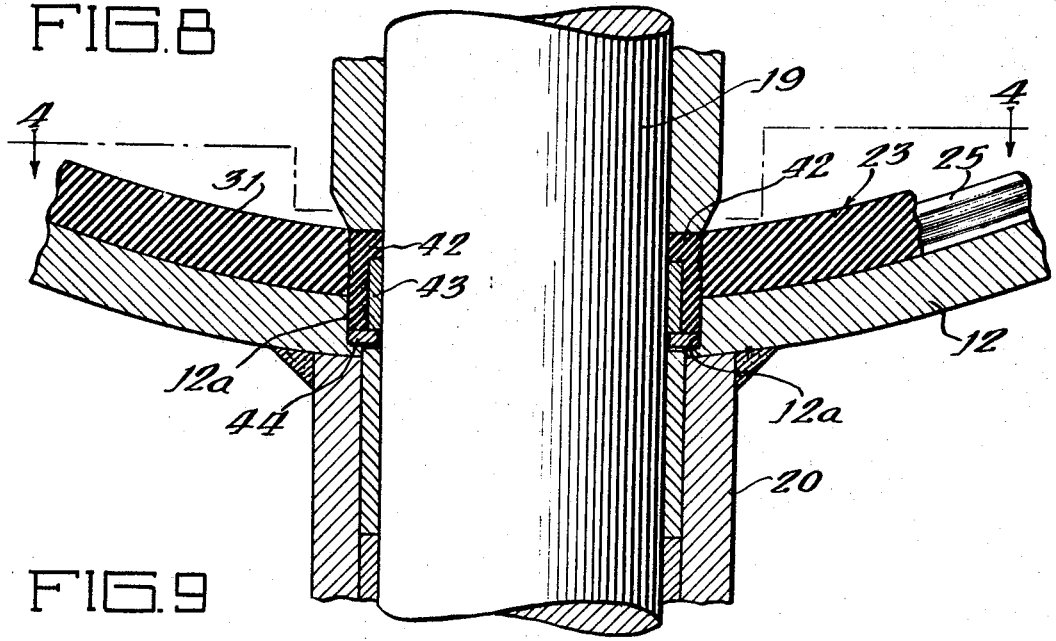
FIG. 8 is a fragmentary vertical section taken approximately along the line 8—8 of FIG. 4.

The seat described above seals against the periphery of the disc. The shaft for the disc has a separate seal with the housing and the seat and shaft seal abut each other at their juncture. As best seen in FIG. 8, shaft 19 is sealed where it passes through body 12 by means of an annular, L-section seal 42 compressed between an annular metallic back-up ring 43 and wall 12a of a recess in body 12 in which the seal is received. A washer 44 is provided to prevent extrusion of the seal material outwardly along the shaft. The internal diameter of back-up ring 43 may be equal to or slightly larger than the internal diameter of seal ring 42. The rubber of seat 23 abuts endwise against the seal 42 about the shaft extension.

With the improved adjustable sealing means 15, the fitting of seat 23 to disc 11 is extremely simple. The sealing means is readily installed in groove 22 by first inserting valve seat 23 into the groove to have its side 29 abut side wall 25 of the groove. Segments 34 are then installed in the groove with side 35 abutting side 30 of seat 23, the segments being installed end to end in a substantially continuous annular arrangement. The shaft seals are next installed in the groove. Then segments 38 are installed end to end to form the continuous annular arrangement described.

By manipulation of a suitable tool, such as a screwdriver, in slot 40a, studs 40 are advanced into engagement with surfaces 36 of segments 34. This results in the urging of segments 34 toward valve seat 23 and the opposite urging of segments 38 toward groove side wall 26 until a secure, forceful engagement therebetween results. As a result of the forcible urging of segments 34 against valve seat 23, the valve seat is, in turn, forced tightly against groove side wall 25.

The individual adjustability of the segments 34 permits different pressures to be applied to different circumferentially related portions of the valve seat 23. The pressure applied to valve seat 23 by the individual segments 34 causes the valve seat to be compressed and, as a result thereof, to be extended radially inwardly (toward the axis of body 12). Thus, the different portions of valve seat 23 are readily adjusted to have an accurate fit with the periphery 11a of the disc by the simple expedient of adjusting studs 40.

As best seen in FIG. 3, the axis of each stud 40 extends outwardly (away from the axis of body 12) toward valve seat 23 so that a component of the force exerted by segments 34 on valve seat 23 is directed outwardly of the valve. As a result, valve seat 23 is forced into sealing engagement with bottom 27 of groove 22 thereby preventing leakage of pressure around the seat. Further, valve seat 23 is made to be relatively narrow so that should any fluid reach the outside of the valve seat between the valve seat and the groove bottom, it would be effectively precluded from having an undesirable inward bulging effect on surface 31, which effect occurs in certain known devices and tends to prevent opening of the valve. The mid-portion of the valve seat is urged into sealing engagement with the groove bottom 27 by compression from the disc edge 11a; any fluid reaching the mid-portion is relieved to the opposite side of the seat along the groove bottom rather than being contained to build up and act radially inwardly to bind the disc in the closed position.

Figure 9:
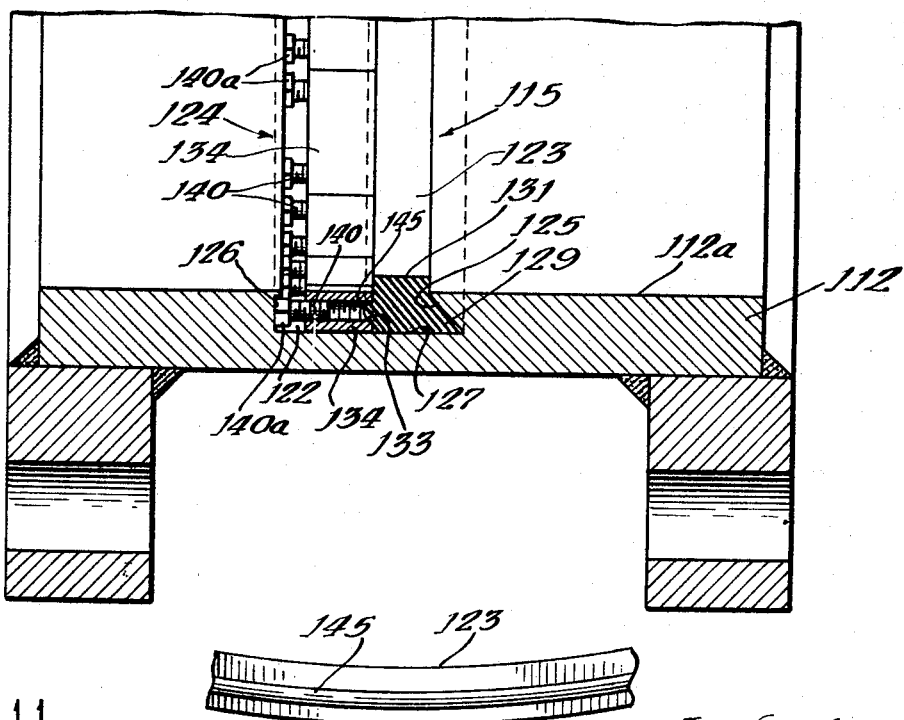
FIG. 9 is a section of a modified form of the valve body and sealing means.
Figure 11:
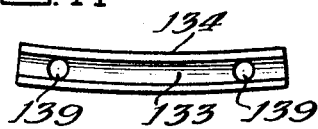
FIG. 11 is a front elevation of a segment of the retaining means thereof.
Figure 10:
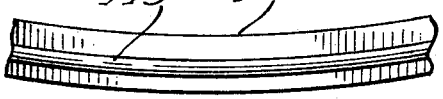
FIG. 10 is a front elevation of the seat thereof.

In FIGS. 9 through 11, a modified form of body and seat structure is shown to comprise a cylindrical fabricated body 112 having an inwardly opening annular groove 122 provided with a frusto-conical side wall 125, an opposite, undercut side wall 126 and a bottom 127.

A seat structure 115 is disposed within groove 122 and comprises an annular rubber valve seat 123 having a side 129 complementary to and in abutment with frusto-conical side wall 125 of the groove, and a retaining means 124. The thickness of valve seat 123 is greater than the depth of groove 122, whereby inner surface 131 of the valve seat is disposed inwardly of surface 112a of body 112 for sealing engagement by the valve gate (not shown).

Retaining means 124 is disposed in groove 122 between valve seat 123 and side wall 126. In this modified form, retaining means 124 includes a clamping portion comprising a plurality of arcuate segments 134 arranged end to end in abutting relation. Each segment 134 is provided with a plurality of threaded bores 139 extending through the segments parallel to the axis of body 112. A bolt 140 is associated with each bore 139 and extends from the segments into abutment with side wall 126 of the groove. Side wall 126 is undercut to a depth less than the length of head 140a of bolt 140 so that a portion of the head is freely accessible from inwardly of the groove.

The rubber valve seat 123 is molded with a side bead 145 which projects therefrom into a corresponding groove 133 in the segments 134 to lock valve seat 123 to retaining means 124 when the sealing means is properly installed.

To install the seat structure 115 in groove 122, valve seat 123 is inserted into the groove so as to have its side or projecting lip portion 129 abut side wall 125 of the groove. Segments 134 are then installed in the groove with bolts 140 threaded into bores 139 so as to permit clearance of the bolt heads 140a with groove side wall 126. When the segments are installed in the groove so as to abut bottom 127 thereof, the bolts 140 are manipulated by means of a suitable tool. such as an open ended wrench, to move heads 140a away from the segmenst until the bolt heads abut the undercut groove side wall 126. Continued withdrawal threading of bolt 140 in bores 139 causes segments 134 to be urged to the right, as seen in FIG. 9, and bear forcibly against the valve seat 123. This, in turn, forces side 129 of the valve seat into tight sealing engagement with side wall 125 of the groove. Because of the outwardly inclined relationship of side wall 125 to bottom 127 of the groove, the valve seat is forced tightly into sealing engagement with each of the side wall 125 and bottom 127. This effectively precludes leakage of fluid pressure between the valve seat 123 and groove bottom 127. However, as in valve 10, the disc periphery presses the mid-portion of the seat 123 against bottom 127 and any fluid which for any reason might pass to a point therebetween will pass harmlessly on to the opposite side of the seat and, thus, can not urge the seat inwardly to bind the disc in the closed position.

As clamping portion 133 of the retaining means is segmental, adjustment of the individual segments 134 permits adjustment of the compressive force produced on valve seat 123 by the different segments so that different circumferentially related portions of the valve seat may be compressed as desired to effect a proper inward extension of surface 131. Thus, an accurate fit between surface 131 and the periphery of the valve gate may be readily effected.

The foregoing detailed description has been given for the clearness of understanding only and no unnecessary limitations should be understood thereform for some modifications will be obvious to those skilled in the art.

I claim:
1. A valve seat for a butterfly valve having a valve body carrying a valve disc, comprising: a valve seat of resilient material in the interior of said valve body and having an inner surface, said valve seat having a width generally of the order of its radial thickness, said body having an annular groove in its interior surface receiving said valve seat with the resilient material extending radially inwardly beyond the valve body, said body groove including opposite side walls and having a width in excess of the width of the valve seat material; valve seat retaining means in said body groove having one portion abutting one side wall, a second portion abutting the valve seat, and adjustable means on the one portion forcing the second portion against the valve seat to compress the seat longitudinally against the other side wall and thereby adjust the internal diameter thereof, said adjustable means further forcing said second portion outwardly against said seat thereby sealingly engaging said seat with said groove bottom.

2. A valve seat for a butterfly valve having a valve body carrying a valve disc, comprising: a valve seat of resilient material in the interior of said valve body, said body having an annular groove in its interior surface receving said valve seat with the resilient material extending radially inwardly beyond the interior surface of said valve body, said body groove including opposite side walls and having a width in excess of the width of the valve seat material; valve seat retaining means in said body groove having one portion abutting one side wall, a second portion abutting the valve seat comprising a plurality of arcuate segments arranged end-to-end, and adjustable means on the one portion for adjustably forcing the different segments of the second portion against the valve seat to compress selectively different portions of the seat toward the other side wall and thereby adjust the internal diameter thereof.

References Cited

UNITED STATES PATENTS

| | | | |
|---|---|---|---|
| 1,546,594 | 7/1925 | McAulay | 251—307 |
| 1,624,891 | 4/1927 | Hutchinson | 251—307 |
| 2,847,181 | 8/1958 | Muller | 251—306 |
| 1,575,259 | 3/1926 | Fisher | 251—328 X |
| 1,977,351 | 10/1934 | Phillips | 251—306 |

WILLIAM F. O'DEA, *Primary Examiner.*

R. GERARD, *Assistant Examiner.*